US010077502B2

(12) United States Patent
Shinohara et al.

(10) Patent No.: US 10,077,502 B2
(45) Date of Patent: Sep. 18, 2018

(54) SILVER-PLATED PRODUCT

(71) Applicant: DOWA METALTECH CO., LTD., Tokyo (JP)

(72) Inventors: Keisuke Shinohara, Saitama (JP); Masafumi Ogata, Saitama (JP); Hiroshi Miyazawa, Saitama (JP); Akira Sugawara, Shizuoka (JP)

(73) Assignee: Dowa Metaltech Co., Ltd., Tokyo (JP)

( * ) Notice: Subject to any disclaimer, the term of this patent is extended or adjusted under 35 U.S.C. 154(b) by 192 days.

(21) Appl. No.: 14/778,159

(22) PCT Filed: Feb. 18, 2014

(86) PCT No.: PCT/JP2014/054252
§ 371 (c)(1),
(2) Date: Sep. 18, 2015

(87) PCT Pub. No.: WO2014/148200
PCT Pub. Date: Sep. 25, 2014

(65) Prior Publication Data
US 2016/0281253 A1 Sep. 29, 2016

(30) Foreign Application Priority Data
Mar. 21, 2013 (JP) ................................ 2013-057510

(51) Int. Cl.
*B32B 15/01* (2006.01)
*C25D 5/10* (2006.01)
(Continued)

(52) U.S. Cl.
CPC ................ *C25D 5/10* (2013.01); *C25D 3/46* (2013.01); *C25D 7/00* (2013.01); *H01H 1/025* (2013.01);
(Continued)

(58) Field of Classification Search
None
See application file for complete search history.

(56) References Cited

U.S. PATENT DOCUMENTS

2009/0053550 A1 2/2009 Kashima et al.
2015/0243408 A1 8/2015 Shinohara et al.

FOREIGN PATENT DOCUMENTS

EP 2 749 673 A1 7/2014
JP 3889718 B2 12/2006
(Continued)

OTHER PUBLICATIONS

International Search Report for PCT/JP2014/054252 dated May 12, 2014.
(Continued)

*Primary Examiner* — Daniel J Schleis
(74) *Attorney, Agent, or Firm* — Bachman & LaPointe, PC

(57) ABSTRACT

There is provided a silver-plated product which has good thermal resistance, bendability and wear resistance. In a silver-plated product wherein a surface layer of silver having a thickness of 10 μm or less is formed on a base material of copper or a copper alloy, the full-width at half maximum of a rocking curve on a preferred orientation plane (preferably {200} or {111} plane) of the surface layer is caused to be 2 to 8°, preferably 3 to 7°, to improve the out-of-plane orientation of the surface layer to improve the thermal resistance, bendability and wear resistance of the silver-plated product.

4 Claims, 1 Drawing Sheet

(51) Int. Cl.

| | |
|---|---|
| ***C25D 3/46*** | (2006.01) |
| ***C25D 7/00*** | (2006.01) |
| ***H01H 1/025*** | (2006.01) |
| ***H01H 11/04*** | (2006.01) |
| *H01R 13/03* | (2006.01) |
| *C25D 5/34* | (2006.01) |

(52) U.S. Cl.

CPC ............ *H01H 11/041* (2013.01); *C25D 5/34* (2013.01); *H01H 2011/046* (2013.01); *H01R 13/03* (2013.01)

(56) References Cited

FOREIGN PATENT DOCUMENTS

| | | | | |
|---|---|---|---|---|
| JP | 4279285 | B2 | | 3/2009 |
| JP | 2010-146925 | A | | 7/2010 |
| JP | 2012-162775 | A | | 8/2012 |
| JP | 2012162775 | | * | 8/2012 |
| WO | 2013/047628 | A1 | | 4/2013 |

OTHER PUBLICATIONS

European search report for application No. 14 76 8027 dated Oct. 20, 2016.

* cited by examiner

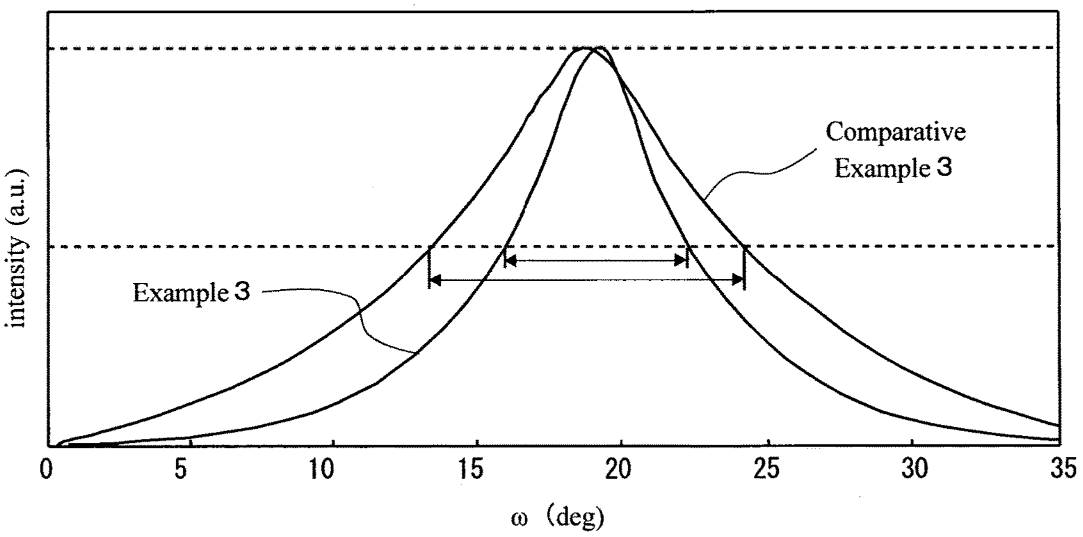
Comparative
Example 3
Example 3
intensity (a.u.)
0
5
10
15
20
25
30
35
ω (deg)

SILVER-PLATED PRODUCT

TECHNICAL FIELD

The present invention generally relates to a silver-plated product. More specifically, the invention relates to a silver-plated product used as the material of contact and terminal parts, such as connectors, switches and relays, which are used for automotive and/or household electric wiring.

BACKGROUND ART

As conventional materials of contact and terminal parts, such as connectors and switches, there are used plated products wherein a base material of stainless steel, copper, a copper alloy or the like, which is relatively inexpensive and which has excellent corrosion resistance, mechanical characteristics and so forth, is plated with tin, silver, gold or the like in accordance with required characteristics, such as electrical and soldering characteristics.

Tin-plated products obtained by plating a base material of stainless steel, copper, a copper alloy or the like, with tin are inexpensive, but they do not have good corrosion resistance. Gold-plated products obtained by plating such a base material with gold have excellent corrosion resistance and high reliability, but the costs thereof are high. On the other hand, silver-plated products obtained by plating such a base material with silver are inexpensive in comparison with gold-plated products and have excellent corrosion resistance in comparison with tin-plated products.

As such a silver-plated product, there is proposed a metal plate for electrical contacts, wherein a silver plating film having a thickness of 1 μm is formed on a copper plating film having a thickness of 0.1 to 0.5 μm which is formed on a nickel plating film having a thickness of 0.1 to 0.3 μm which is formed on the surface of a thin base material plate of stainless steel (see, e.g., Japanese Patent No. 3889718). There is also proposed a silver-coated stainless bar for movable contacts, wherein a surface layer of silver or a silver alloy having a thickness of 0.5 to 2.0 μm is formed on an intermediate layer of at least one of nickel, a nickel alloy, copper and a copper alloy having a thickness of 0.05 to 0.2 μm, the intermediate layer being formed on an activated underlying layer of nickel which has a thickness of 0.01 to 0.1 μm and which is formed on the surface of a base material of stainless steel (see, e.g., Japanese Patent No. 4279285). Moreover, there is proposed a silver-coated material for movable contact parts, wherein a surface layer of silver or a silver alloy having a thickness of 0.2 to 1.5 μm is formed on an intermediate layer of copper or a copper alloy having a thickness of 0.01 to 0.2 μm, the intermediate layer being formed on an underlying layer of any one of nickel, a nickel alloy, cobalt or a cobalt alloy which has a thickness of 0.005 to 0.1 μm and which is formed on a metallic substrate of copper, a copper alloy, iron or an iron alloy, and wherein the arithmetic average roughness Ra of the metallic substrate is 0.001 to 0.2 μm, and the arithmetic average roughness Ra after forming the intermediate layer is 0.001 to 0.1 μm (see, e.g., Japanese patent Laid-Open No. 2010-146925).

However, if a silver plating film is formed on the surface of a base material of copper or a copper alloy or on the surface of an underlying layer of copper or a copper alloy formed on a base material in such a conventional silver-plated product, there is a problem in that copper diffuses to form CuO on the surface of the silver plating film to raise the contact resistance thereof if it is used in a high-temperature environment. There is also a problem in that cracks are formed in the silver-plated product to expose the base material if the silver-plated product is worked in a complicated shape or in a shape of small contact and terminal parts, such as connectors and switches. Moreover, there is a problem in that the silver plating film is easily worn.

DISCLOSURE OF THE INVENTION

It is therefore an object of the present invention to eliminate the above-described conventional problems and to provide a silver-plated product having good thermal resistance, bendability and wear resistance.

In order to accomplish the aforementioned object, the inventors have diligently studied and found that it is possible to produce a silver-plated product having good thermal resistance, bendability and wear resistance if the full-width at half maximum of a rocking curve on a preferred orientation plane of a surface layer is 2 to 8° in a silver-plated material wherein the surface layer of silver is formed on a base material. Thus, the inventors have made the present invention.

According to the present invention, a silver-plated product comprises: a base material; and a surface layer of silver which is formed on the base material, wherein the full-width at half maximum of a rocking curve on a preferred orientation plane of the surface layer is 2 to 8°. In this silver-plated product, the full-width at half maximum of the rocking curve on the preferred orientation plane of the surface layer is preferably 3 to 7°, and the preferred orientation plane of the surface layer is preferably {200} or {111} plane. The base material is preferably made of copper or a copper alloy, and the surface layer preferably has a thickness of 10 μm or less.

According to the present invention, there is provided a contact or terminal part which is made of the above-described silver-plated product.

According to the present invention, it is possible to produce a silver-plated product having good thermal resistance, bendability and wear resistance.

BRIEF DESCRIPTION OF THE DRAWINGS

FIG. 1 is a graph showing a rocking curve on a preferred orientation plane of a silver plating film of a silver-plated product in each of Example 3 and Comparative Example 3, and a full-width at half maximum thereof.

BEST MODE FOR CARRYING OUT THE INVENTION

In the preferred embodiment of a silver-plated product according to the present invention, the full-width at half maximum of a rocking curve on a preferred orientation plane of a surface layer of a silver-plated product, wherein the surface layer of silver is formed on a base material, is 2 to 8°, preferably 3 to 7°.

If the full-width at half maximum of the rocking curve on the preferred orientation plane of the surface layer of silver is thus 2 to 8° preferably 3 to 7°, the out-of-plane orientation of the surface layer is improved, so that it is possible to improve the thermal resistance, bendability and wear resistance of the silver-plated product.

In this silver-plated product, the preferred orientation plane of the surface layer is preferably {200} or {111} plane. The base material is preferably made of copper or a copper alloy, and the surface layer preferably has a thickness of 10 μm or less.

The surface layer of silver of the silver-plated product can be formed by electroplating at a current density of 3 to 10 $A/dm^2$ and a liquid temperature of 10 to 40° C. (preferably 15 to 30° C.) in a silver plating solution which comprises silver potassium cyanide ($KAg(CN)_2$), potassium cyanide (KCN), and 3 to 30 mg/L of potassium selenocyanate (KSeCN) and wherein the concentration of selenium in the silver plating solution is 5 to 15 mg/L, the mass ratio of silver to free cyanogen being in the range of from 0.9 to 1.8.

Examples of a silver-plated product according to the present invention will be described below in detail.

Example 1

First, a pure copper plate having a size of 67 mm×50 mm×0.3 mm was prepared as a base material (a material to be plated). The material to be plated and a SUS plate were put in an alkali degreasing solution to be used as a cathode and an anode, respectively, to carry out electrolytic degreasing at 5 V for 30 seconds. The material thus electrolytic-degreased was washed, and then, pickled for 15 seconds in a 3% sulfuric acid.

Then, the material to be plated and a titanium electrode plate coated with platinum were used as a cathode and an anode, respectively, to electroplate (silver-strike-plate) the material at a current density of 2.5 $A/dm^2$ for 10 seconds in a silver strike plating bath comprising 3 g/L of silver potassium cyanide and 90 g/L of potassium cyanide while stirring the solution at 400 rpm by a stirrer.

Then, the material to be plated and a silver electrode plate were used as a cathode and an anode, respectively, to electroplate (silver-plate) the material at a current density of 5 $A/dm^2$ and a liquid temperature of 18° C. in a silver plating bath comprising 148 g/L of silver potassium cyanide ($KAg(CN)_2$), 140 g/L of potassium cyanide and 18 mg/L of potassium selenocyanate (KSeCN) while stirring the solution at 400 rpm by a stirrer, until a silver plating film having a thickness of 3 micrometers was formed. Furthermore, in the used silver plating bath, the concentration of Se was 10 mg/L, and the concentration of Ag was 80 g/L, the concentration of free CN being 56 g/L, and the mass ratio of Ag to free CN being 1.44.

With respect to a silver-plated product thus produced, the crystal orientation, thermal resistance, bendability and wear resistance of a silver plating film were evaluated.

In order to evaluate the crystal orientation of the silver plating film of the silver-plated product, an X-ray diffractometer (XRD) (Full-Automatic Multi-Purpose Horizontal X-ray diffractometer, Smart Lab produced by RIGAKU Corporation) was used for obtaining an X-ray diffraction pattern by carrying out the 2θ/θ scan using an X-ray tube of Cu and the Kβ filter method. Then, from the X-ray diffraction pattern thus obtained, each of X-ray diffraction peak intensities (intensities of X-ray diffraction peaks) on {111}, {200}, {220} and {311} planes of the silver plating film was corrected by relative intensity ratios (relative intensity ratios in the measurement of powder) described on JCPD card No. 40783. Then, the plane orientation of an X-ray diffraction peak, at which each of values (corrected intensities) obtained by the above-described correction was highest, was evaluated as the direction of the crystal orientation (the preferred orientation plane) of the silver plating film to obtain a diffraction angle 2θ of the X-ray diffraction peak on the preferred orientation plane in the scanning range of 2θ/θ to obtain a rocking curve (intensity curve) by scanning an angle ω of incidence at a fixed diffraction angle 2θ to obtain a full-width at half maximum of the rocking curve. Furthermore, it is possible to determine the strength of the out-of-plane orientation by the full-width at half maximum of the rocking curve, and the out-of-plane orientation is stronger as the full-width at half maximum of the rocking curve is sharper (i.e., the full-width at half maximum is smaller). As a result, in the silver-plated product in this example, the crystals of the silver plating film were orientated to {200} plane (orientated so that {200} plane was directed to the surface (plate surface) of the silver-plated product), i.e., the preferred orientation plane of the silver plating film was {200} plane. The full-width at half maximum of the rocking curve was a small value of 3.8°, so that the out-of-plane orientation was strong.

The thermal resistance of the silver-plated product was evaluated by measuring a contact resistance thereof at a load of 50 gf by means of an electrical contact simulator (CRS-1 produced by Yamasaki-Seiki Co., Ltd.) before and after a heat-proof test in which the silver-plated product was heated at 200° C. for 144 hours by means of a dryer (OF450 produced by AS ONE Corporation). As a result, the contact resistance of the silver-plated product was 0.9 mΩ before the heat-proof test and 2.4 mΩ after the heat-proof test. Thus, the contact resistance after the heat-proof test was a good value which was not higher than 5 mΩ, so that the rise of the contact resistance was restrained after the heat-proof test.

The bendability of the silver-plated product was evaluated on the basis of the presence of cracks in a bent portion of the silver-plated product by observing the bent portion at a power of 1000 by means of a microscope (Digital Microscope VHX-1000 produced by KEYENCE CORPORATION) after the silver-plated product was bent by 90 degrees at R=0.1 in a direction perpendicular to the direction of rolling of the base material in accordance with the V-block method described in Japanese Industrial Standard (JIS) Z2248. As a result, cracks were not observed, so that the bendability of the silver-plated product was good.

The wear resistance of the silver plating film of the silver-plated product was evaluated as follows. First, about 30 mg of a grease (MULTEMP D No. 2 produced by Kyodo Yushi Co., Ltd.) per an area of 8 $cm^2$ was applied on the plate surface of the silver-plated product to be uniformly extended. Then, a sliding tester was used for causing a silver rivet containing 89.7 wt % of Ag and 0.3 wt % of Mg and having a curvature radius of 8 mm to slide as a reciprocation sliding motion on the plate surface of the silver-plated product, to which a current of 500 mA was applied, while the silver rivet was pressed against to the plate surface thereof at a load of 100 gf. After such a reciprocation sliding motion (sliding distance of 5 mm, sliding speed of 12 mm/sec) was continued 300,000 times, the abrasion loss of the silver plating film was measured for evaluating the wear resistance. As a result, the abrasion loss of the silver plating film was 0.6 μm, so that the wear resistance of the silver-plated product was good.

Example 2

A silver-plated product was produced by the same method as that in Example 1, except that the material to be plated was electroplated (silver-plated) in a silver plating bath comprising 148 g/L of silver potassium cyanide, 140 g/L of potassium cyanide and 11 mg/L of potassium selenocyanate. Furthermore, in the used silver plating bath, the concentration of Se was 6 mg/L, and the concentration of Ag was 80 g/L, the concentration of free CN being 56 g/L, and the mass ratio of Ag to free CN being 1.44.

With respect to a silver-plated product thus produced, the crystal orientation, thermal resistance, bendability and wear resistance of the silver plating film were evaluated by the same methods in those in Example 1.

As a result, in the evaluation of the crystal orientation of the silver plating film, the crystals of the silver plating film were orientated to {200} plane, i.e., the preferred orientation plane of the silver plating film was {200} plane. The full-width at half maximum of the rocking curve was a small value of 5.2°, so that the out-of-plane orientation was strong. In the evaluation of the thermal resistance of the silver-plated product, the contact resistance of the silver-plated product was 1.0 mΩ before the heat-proof test and 2.4 mΩ after the heat-proof test. Thus, the contact resistance after the heat-proof test was a good value which was not higher than 5 mΩ, so that the rise of the contact resistance was restrained after the heat-proof test. In the evaluation of the bendability of the silver-plated product, cracks were not observed, so that the bendability of the silver-plated product was good. In the evaluation of the wear resistance of the silver-plated product, the abrasion loss of the silver plating film was 0.6 μm, so that the wear resistance of the silver-plated product was good.

Example 3

A silver-plated product was produced by the same method as that in Example 1, except that the material to be plated was electroplated (silver-plated) in a silver plating bath comprising 148 g/L of silver potassium cyanide, 140 g/L of potassium cyanide and 6 mg/L of potassium selenocyanate. Furthermore, in the used silver plating bath, the concentration of Se was 3 mg/L, and the concentration of Ag was 80 g/L, the concentration of free CN being 56 g/L, and the mass ratio of Ag to free CN being 1.44.

With respect to a silver-plated product thus produced, the crystal orientation, thermal resistance, bendability and wear resistance of the silver plating film were evaluated by the same methods in those in Example 1.

As a result, in the evaluation of the crystal orientation of the silver plating film, the crystals of the silver plating film were orientated to {200} plane, i.e., the preferred orientation plane of the silver plating film was {200} plane. The full-width at half maximum of the rocking curve was a small value of 6.0°, so that the out-of-plane orientation was strong. In the evaluation of the thermal resistance of the silver-plated product, the contact resistance of the silver-plated product was 1.0 mΩ before the heat-proof test and 1.9 mΩ after the heat-proof test. Thus, the contact resistance after the heat-proof test was a good value which was not higher than 5 mΩ, so that the rise of the contact resistance was restrained after the heat-proof test. In the evaluation of the bendability of the silver-plated product, cracks were not observed, so that the bendability of the silver-plated product was good. In the evaluation of the wear resistance of the silver-plated product, the abrasion loss of the silver plating film was 0.4 μm, so that the wear resistance of the silver-plated product was good.

Example 4

A silver-plated product was produced by the same method as that in Example 1, except that the material to be plated was electroplated (silver-plated) at a liquid temperature of 25° C. in a silver plating bath comprising 111 g/L of silver potassium cyanide, 120 g/L of potassium cyanide and 18 mg/L of potassium selenocyanate. Furthermore, in the used silver plating bath, the concentration of Se was 10 mg/L, and the concentration of Ag was 60 g/L, the concentration of free CN being 48 g/L, and the mass ratio of Ag to free CN being 1.26.

With respect to a silver-plated product thus produced, the crystal orientation, thermal resistance, bendability and wear resistance of the silver plating film were evaluated by the same methods in those in Example 1.

As a result, in the evaluation of the crystal orientation of the silver plating film, the crystals of the silver plating film were orientated to {111} plane, i.e., the preferred orientation plane of the silver plating film was {111} plane. The full-width at half maximum of the rocking curve was a small value of 6.3°, so that the out-of-plane orientation was strong. In the evaluation of the thermal resistance of the silver-plated product, the contact resistance of the silver-plated product was 0.8 mΩ before the heat-proof test and 1.7 mΩ after the heat-proof test. Thus, the contact resistance after the heat-proof test was a good value which was not higher than 5 mΩ, so that the rise of the contact resistance was restrained after the heat-proof test. In the evaluation of the bendability of the silver-plated product, cracks were not observed, so that the bendability of the silver-plated product was good. In the evaluation of the wear resistance of the silver-plated product, the abrasion loss of the silver plating film was 0.4 μm, so that the wear resistance of the silver-plated product was good.

Comparative Example 1

A silver-plated product was produced by the same method as that in Example 1, except that the material to be plated was electroplated (silver-plated) in a silver plating bath comprising 148 g/L of silver potassium cyanide, 140 g/L of potassium cyanide and 73 mg/L of potassium selenocyanate. Furthermore, in the used silver plating bath, the concentration of Se was 40 mg/L, and the concentration of Ag was 80 g/L, the concentration of free CN being 56 g/L, and the mass ratio of Ag to free CN being 1.44.

With respect to a silver-plated product thus produced, the crystal orientation, thermal resistance, bendability and wear resistance of the silver plating film were evaluated by the same methods in those in Example 1.

As a result, in the evaluation of the crystal orientation of the silver plating film, the crystals of the silver plating film were orientated to {111} plane, i.e., the preferred orientation plane of the silver plating film was {111} plane. The full-width at half maximum of the rocking curve was a large value of 13.3°, so that the out-of-plane orientation was weak. In the evaluation of the thermal resistance of the silver-plated product, the contact resistance of the silver-plated product was 0.7 mΩ before the heat-proof test and 574.5 mΩ after the heat-proof test. Thus, the contact resistance after the heat-proof test was very high, so that the rise of the contact resistance was not restrained after the heat-proof test. In the evaluation of the bendability of the silver-plated product, cracks were observed, so that the bendability of the silver-plated product was not good. In the evaluation of the wear resistance of the silver-plated product, the abrasion loss of the silver plating film was 1.5 μm, so that the wear resistance of the silver-plated product was not good.

Comparative Example 2

A silver-plated product was produced by the same method as that in Example 1, except that the material to be plated was electroplated (silver-plated) in a silver plating bath comprising 148 g/L of silver potassium cyanide, 140 g/L of potassium cyanide and 2 mg/L of potassium selenocyanate. Furthermore, in the used silver plating bath, the concentration of Se was 1 mg/L, and the concentration of Ag was 80 g/L, the concentration of free CN being 56 g/L, and the mass ratio of Ag to free CN being 1.44.

With respect to a silver-plated product thus produced, the crystal orientation, thermal resistance, bendability and wear resistance of the silver plating film were evaluated by the same methods in those in Example 1.

As a result, in the evaluation of the crystal orientation of the silver plating film, the crystals of the silver plating film were orientated to {111} plane, i.e., the preferred orientation plane of the silver plating film was {111} plane. The full-width at half maximum of the rocking curve was a large value of 8.1°, so that the out-of-plane orientation was weak. In the evaluation of the thermal resistance of the silver-plated product, the contact resistance of the silver-plated product was 1.0 mΩ before the heat-proof test and 6.5 mΩ after the heat-proof test. Thus, the contact resistance after the heat-proof test was higher than 5 mΩ, so that the rise of the contact resistance was not restrained after the heat-proof test. In the evaluation of the bendability of the silver-plated product, cracks were observed, so that the bendability of the silver-plated product was not good. In the evaluation of the wear resistance of the silver-plated product, the abrasion loss of the silver plating film was 1.5 μm, so that the wear resistance of the silver-plated product was not good.

Comparative Example 3

A silver-plated product was produced by the same method as that in Example 1, except that the material to be plated was electroplated (silver-plated) at a current density of 1.2 A/dm$^2$ and a liquid temperature of 47° C. in a silver plating bath comprising 150 g/L of silver potassium cyanide and 90 g/L of potassium cyanide. Furthermore, in the used silver plating bath, the concentration of Se was 0 mg/L, and the concentration of Ag was 81 g/L, the concentration of free CN being 36 g/L, and the mass ratio of Ag to free CN being 2.25.

With respect to a silver-plated product thus produced, the crystal orientation, thermal resistance, bendability and wear resistance of the silver plating film were evaluated by the same methods in those in Example 1.

As a result, in the evaluation of the crystal orientation of the silver plating film, the crystals of the silver plating film were orientated to {111} plane, i.e., the preferred orientation plane of the silver plating film was {111} plane. The full-width at half maximum of the rocking curve was a large value of 10.8°, so that the out-of-plane orientation was weak. In the evaluation of the thermal resistance of the silver-plated product, the contact resistance of the silver-plated product was 0.9 mΩ before the heat-proof test and 2.0 mΩ after the heat-proof test. Thus, the contact resistance after the heat-proof test was a good value which was not higher than 5 mΩ, so that the rise of the contact resistance was restrained after the heat-proof test. In the evaluation of the bendability of the silver-plated product, cracks were observed, so that the bendability of the silver-plated product was not good. In the evaluation of the wear resistance of the silver-plated product, the abrasion loss of the silver plating film was 2.0 μm, so that the wear resistance of the silver-plated product was not good.

Comparative Example 4

A silver-plated product was produced by the same method as that in Example 1, except that the material to be plated was electroplated (silver-plated) at a current density of 2 A/dm$^2$ and a liquid temperature of 25° C. in a silver plating bath comprising 111 g/L of silver potassium cyanide, 120 g/L of potassium cyanide and 18 mg/L of potassium selenocyanate. Furthermore, in the used silver plating bath, the concentration of Se was 10 mg/L, and the concentration of Ag was 60 g/L, the concentration of free CN being 48 g/L, and the mass ratio of Ag to free CN being 1.26.

With respect to a silver-plated product thus produced, the crystal orientation, thermal resistance, bendability and wear resistance of the silver plating film were evaluated by the same methods in those in Example 1.

As a result, in the evaluation of the crystal orientation of the silver plating film, the crystals of the silver plating film were orientated to {220} plane, i.e., the preferred orientation plane of the silver plating film was {220} plane. The full-width at half maximum of the rocking curve was a large value of 13.0°, so that the out-of-plane orientation was weak. In the evaluation of the thermal resistance of the silver-plated product, the contact resistance of the silver-plated product was 1.0 mΩ before the heat-proof test and 11.1 mΩ after the heat-proof test. Thus, the contact resistance after the heat-proof test was higher than 5 mΩ, so that the rise of the contact resistance was not restrained after the heat-proof test. In the evaluation of the bendability of the silver-plated product, cracks were observed, so that the bendability of the silver-plated product was not good. In the evaluation of the wear resistance of the silver-plated product, the abrasion loss of the silver plating film was 1.9 μm, so that the wear resistance of the silver-plated product was not good.

The producing conditions and characteristics of the silver-plated product in each of these examples and comparative examples are shown in Tables 1 and 2, respectively. In order to explain the rocking curve and the full-width at half maximum thereof, FIG. 1 shows the rocking curve on the preferred orientation plane of the silver plating film of the silver-plated product in each of Example 3 and Comparative Example 3 and the full-width at half maximum thereof.

TABLE 1

| | Composition of Silver Plating Bath | | | Silver Plating Conditions | |
|---|---|---|---|---|---|
| | $K[Ag(CN)_2]$ (g/L) | KCN (g/L) | KSeCN (mg/L) | Current Density (A/dm$^2$) | Plating Temp. (° C.) |
| Example 1 | 148 | 140 | 18 | 5 | 18 |
| Example 2 | 148 | 140 | 11 | 5 | 18 |
| Example 3 | 148 | 140 | 6 | 5 | 18 |
| Example 4 | 111 | 120 | 18 | 5 | 25 |
| Comp. 1 | 148 | 140 | 73 | 5 | 18 |
| Comp. 2 | 148 | 140 | 2 | 5 | 18 |
| Comp. 3 | 150 | 90 | 0 | 1.2 | 47 |
| Comp. 4 | 111 | 120 | 18 | 2 | 25 |

TABLE 2

| | Preferred Orientation Plane | Full-Width at Half Maximum of Rocking Curve on Preferred Orientation Plane (deg) | Contact Resistance before Heat Proof Test (mΩ) | Contact Resistance after Heat Proof Test (mΩ) | Bendability (Presence of Cracks) | Abrasion Loss of Ag (μm) |
|---|---|---|---|---|---|---|
| Ex. 1 | {200} | 3.8 | 0.9 | 2.4 | None | 0.6 |
| Ex. 2 | {200} | 5.2 | 1.0 | 2.4 | None | 0.6 |
| Ex. 3 | {200} | 6.0 | 1.0 | 1.9 | None | 0.4 |
| Ex. 4 | {111} | 6.3 | 0.8 | 1.7 | None | 0.4 |
| Comp. 1 | {111} | 13.3 | 0.7 | 574.5 | Presence | 1.5 |
| Comp. 2 | {111} | 8.1 | 1.0 | 6.5 | Presence | 1.0 |
| Comp. 3 | {111} | 10.8 | 0.9 | 2.0 | Presence | 2.0 |
| Comp. 4 | {220} | 13.0 | 1.0 | 11.1 | Presence | 1.9 |

As can be seen from Tables 1 and 2, the silver-plated product in each of Examples 1 through 4, wherein the full-width at half maximum of the rocking curve on the preferred orientation plane of the silver plating film was 3 to 7°, has good thermal resistance, bendability and wear resistance.

The invention claimed is:

1. A silver-plated product comprising:

a base material of copper or a copper alloy; and a surface layer of silver which is formed on the base material, wherein the full-width at half maximum of a rocking curve on a preferred orientation plane of the surface layer is 6 to 8°, and the preferred orientation plane of the surface layer is {200} plane.

2. A silver-plated product as set forth in claim 1, wherein said full-width at half maximum of the rocking curve on the preferred orientation plane of the surface layer is 6 to 7°.

3. A silver-plated product as set forth in claim 1, wherein said surface layer has a thickness of 10 μm or less.

4. A contact or terminal part which is made of a silver-plated product as set forth in any one of claims 1, 2 and 3.

* * * * *